Jan. 14, 1969   R. P. JAKAS ETAL   3,421,619
METHOD AND MEANS FOR SEPARATING INDIVIDUAL
FIBERS FROM A FIBROUS MASS
Filed March 8, 1967
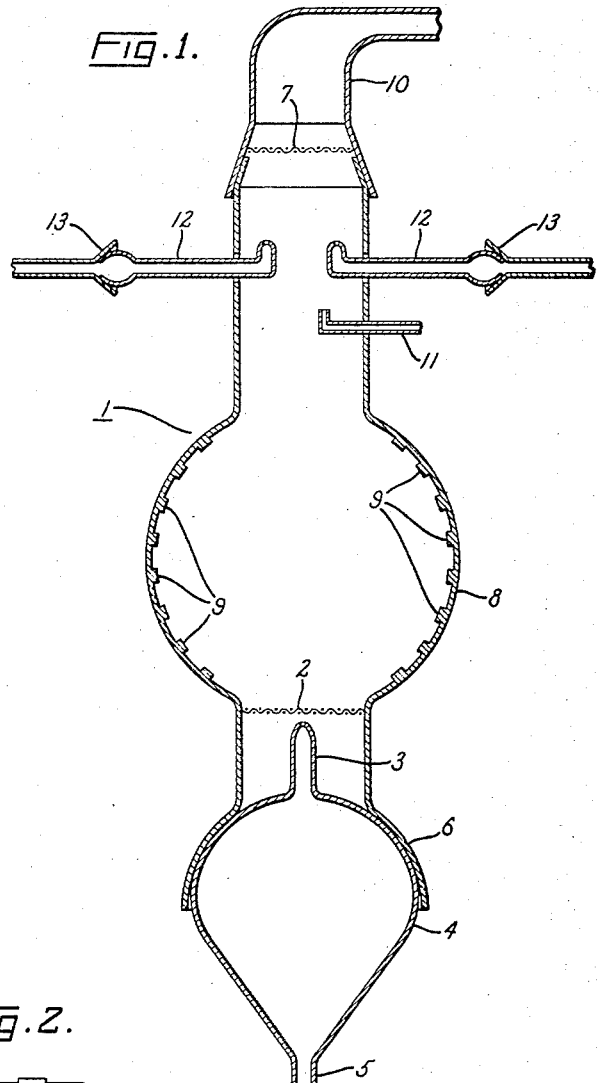
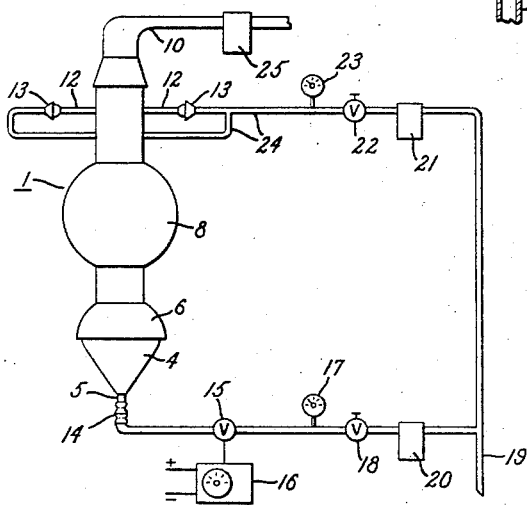
INVENTORS:
JUAN CHORNE,
RIMVYDAS P. JAKAS,
Paul F. Prestia
BY
AGENT United States Patent Office 3,421,619
Patented Jan. 14, 1969

3,421,619
METHOD AND MEANS FOR SEPARATING INDIVIDUAL FIBERS FROM A FIBROUS MASS
Rimvydas P. Jakas, Norristown, and Juan Chorné, King of Prussia, Pa., assignors to General Electric Company, a corporation of New York
Filed Mar. 8, 1967, Ser. No. 621,679
U.S. Cl. 209—141      11 Claims
Int. Cl. B07b 4/00; B07b 11/04

ABSTRACT OF THE DISCLOSURE

A pulsating, upwardly flowing gas stream separates individual fibers from a fibrous mass and carries these fibers to the top of the separatory chamber enclosing the fibrous mass, where the separated fibers are harvested. The fibers, oriented in a horizontal plane, collect in a mat on a screen at the top of the separatory chamber. Separation is enhanced by rotating the source of the pulsed gas flow, by providing an enlarged space where gaseous eddy currents occur in the separatory chamber, by projections on the walls of the separatory chamber and by auxiliary, non-pulsating gas injection. The process is particularly applicable to separating α-alumina whiskers and to classifying separated fibers, according to size, by gradually increasing the pressure of the pulsed gas source.

Introduction

This invention relates to means for separating individual fibers from a fibrous mass and more particularly to means for separating and classifying α-alumina whiskers from a randomly grown mass of such whiskers by a gas suspension process.

Background of the invention

Separating individual fibers from entangled masses thereof has been accomplished, with varying degrees of effectiveness, in numerous ways. For the most part, however, these processes have been crude and inefficient. In one such process, an air jet has been blown laterally into the mass and small clumps of fibers have tended to be separated rather than individual fibers.

A more effective means for separating fibers has been necessitated by the development of fiber-reinforced composite material. Typically, α-alumina whiskers are produced or "grown" in randomly oriented fibrous masses comprised of entangled whiskers of various sizes with by-product waste alumina. High strength composite materials may be made using separated α-alumina whiskers. Yet, the inability heretofore to separate these whiskers has been a major obstacle to their practical utilization in high strength composites. On a laboratory scale, α-alumina whiskers used in reinforced composite materials have been separated, as well as classified and oriented, by hand.

Objects of the invention

It is therefore an object of the present invention to provide a means for separating and collecting the individual fibers from a fibrous mass.

Another object of this invention is to provide a means for simultaneously separating, classifying, orienting, and collecting individual fibers from a fibrous mass.

Still another object of this invention is to provide apparatus for separating and classifying α-alumina whiskers from a randomly mixed collection of such whiskers with other particulate material in a fibrous mass.

Brief summary of the invention

These and other objects are met in accordance with the present invention, by a process which comprises directing a pulsating stream of gas upwardly through a fibrous mass in a separatory chamber, controlling the pressure of the pulsating gas so as to produce a suspension of fibers in the separatory chamber with a gradual upward movement of the suspended fibers, and a screen or other collection means at the top of the separatory chamber to harvest the separated fibers. In the preferred form of the present invention, the separatory chamber also includes an enlarged segment and slight projections from the walls of the chamber to aid in the disentangling of fibers. The preferred form of the apparatus of the present invention, which is particularly adapted to separating, classifying, and collecting α-alumina whiskers, also includes means for varying the frequency of the suspension gas pulsations and for varying the pressure of the suspension gas jet so that the size of the fibers rising to the top of the separatory chamber or to the collection point at the top thereof may be varied.

Detailed description of the invention

While the specification concludes with claims particularly pointing out and distinctly claiming the subject matter of the present invention, this invention may be better understood from the following description, taken in conjunction with the following drawings in which:

FIGURE 1 is a cross-sectional view of the separatory chamber used in the preferred embodiment of the present invention; and FIGURE 2 is a schematic illustration of the separatory chamber and associated equipment.

Referring more specifically to FIGURE 1 there is shown a vertically disposed separatory chamber 1, a bottom screen 2 for supporting the fibrous mass, a nozzle 3, a movable nozzle fitting 4, an inlet line 5, a mating fitting 6 for nozzle fitting 4, located at the bottom of separatory chamber 1, and a screen 7 located at the top of the separatory chamber 1, for collecting the separated fibers. Movable fitting 4 permits movement, more specifically rotation around horizontal and vertical axes, of nozzle 3 so that the pulsating compressed gas stream may be directed toward different points at the bottom of separatory chamber 1. This apparatus also includes an enlarged portion 8 and slight projections 9 to aid in separating fibers. A gas outlet 10 is also shown. Further refinements of this apparatus include an injection means 11 for adding extraneous material, such as resinous or metallic particles, to the gradually rising suspended fibers in the apparatus, and directable gas inlet means 12 with movable fittings 13 for injecting directable non-pulsating gas streams into the separatory chamber, near the top thereof, to further enhance the separation and collection of individual fibers in the apparatus.

In FIGURE 2 there is shown schematically separatory chamber 1, with inlet line 5 connected by a flexible coupling 14 to pulsing valve 15, which is associated with pulse controller 16. One such pulse controller which has been used is that having the commercial designation Atcotrol Series 308, made by the Automatic Timing and Control Company, King of Prussia, Pa. Although pulse duration and pulse frequency may be controlled through broad ranges using this device, in experiments with the present invention, it has been set up generally for pulse durations of 0.1 second, i.e., the valve remains open for 0.1 second each time it is opened, and variable pulse frequency in a range from 3 pulses to 6 pulses per second. Pulse frequencies of from 1 to 18 pulses per three second interval have been used. A pressure indicator 17 and a pressure control valve 18 are used to vary the pressure of compressed gas from inlet line 19 connected to a compressed gas source not shown. A filter 20 is interposed between the compressed gas source and the pressure control valve 18. Non-pulsating gas inlet lines 12 with movable fittings 13 are connected through inlet line 24, which includes a filter 21, a pressure control valve 22 and a pressure indicator 23, to inlet line 19, also. An outlet gas filter 25 is also included.

The method of the present invention, while it may also be carried out in other apparatus, is best described by reference to the operation of the apparatus illustrated. This method comprises placing a fibrous mass, such as a mass of α-alumina whiskers produced in a vapor phase growing process, on the bottom screen 2 of the apparatus. A pulsating gas jet, of pressure and volumetric flow rate slightly greater than that sufficient to cause the smaller whiskers in the mass to rise in the apparatus is caused to emanate from nozzle 3. This produces a suspension of whiskers in the separatory chamber. The separating effectiveness of nozzle 3 may be improved by moving it from time to time during the separation process so that it is directed toward different points at the base of the separatory chamber. Further separation of whiskers occurs in the gaseous eddy currents produced in the enlarged section 8 of the separatory chamber. This separation is also enhanced by the mechanical action of the projections 9 in the separatory chamber 1. Gradually, the smaller whiskers rise individually to the top of the suspension and are collected on the screen 7. When a sufficient proportion of whiskers within this size range have been harvested, the pressure of the pulsed gas jet emanating from nozzle 3 may be increased slightly so that the next larger classification of whiskers may be carried to the top of the suspension collected at screen 7. Successively larger whiskers may thus be segregated and collected. If a resinous or metallic dispersion of the collected whiskers is desired, particulate resin or metallic material may be injected into the suspension within the separatory chamber 1 through the injector means 11. Separation and classification may be enhanced by injecting non-pulsating gas streams, at a pressure slightly below that of the pulsed gas jet, into the upper portion of separatory chamber 1 through directable gas inlet means 12.

In a particular example of this apparatus and its use, a separatory chamber comprising a vertically disposed cylindrical glass unit having an inside diameter of about 2½ inches was formed with an enlarged portion near the bottom thereof with an inside diameter in the enlarged portion of about 6 inches. Its overall height was about 2 feet. Projections of less than ¼ inch were attached to the inner wall of the separatory chamber extending toward the center thereof. Compressed gas inlet line 19, about ½ inch in diameter, was connected to a 100 pound per square inch plant-wide compressed air system. A mass of α-alumina whiskers, as formed in a vapor phase process, was placed on the bottom screen 2 and subjected to the action of an air jet from a 0.050 inch opening in nozzle 3 with a pressure, downstream of valve 18, of about 20 pounds per square inch. After a few minutes an unentangled mat of horizontally oriented, very fine aluminum whiskers was collected at the top screen 5. This mat was removed and the process was resumed using an air jet pressure for the pulsating air jet of about 40 pounds per square inch. This produced a mass of unentangled α-alumina whiskers at the screen 5 slightly larger than those previously collected. The size difference was visually observable. Still another larger size range of fibers was then collected by resuming the process and raising the pressure of the air jet to about 60 pounds per square inch. In this example pulse controller 16 opened valve 15 for about 0.1 second on an average of about 2.5 times per second.

In other tests, pulsating jet frequencies have been varied from 1 to 18 pulses per three second interval and pulsating gas jet pressures from 2 to 100 pounds per square inch have been used. Selection of preferred ranges for these process variables depends on the particular equipment used and the material being separated. Generally, however, air pressures from 20 to 40 pounds per square inch, upstream of the nozzle, in apparatus of the type described, will result in the separation of α-alumina fibers less than 1 square micron in cross-sectional area and 1 millimeter in length. Whiskers 1–100 square microns in cross-sectional area and 1 millimeter to ½ inch in length will be separated by pressures of from 40 to 80 pounds per square inch, and pressures of from 80 to 100 pounds per square inch have been found to be effective to classify whiskers in the size range from 100 to 1000 square microns in cross sectional area and ⅛ to ½ inch in length. In all of these experiments, all components and materials were about at room temperature. When non-pulsating gas jets are used near the top of the separatory chamber to enhance fiber separation, it is generally found desirable to use low volume gas flows in these jets and pressures slightly below that of the pulsating gas jet. Aerodynamic effects, such as vortex formation, may be produced by the directional control of these jets, to improve fiber separation, classification, or collection.

All of these experiments have been conducted as batch processes. On an industrial or semi-industrial scale, it may be desirable to modify this apparatus so that continuous separation may be accomplished. This could be done by providing a means for continuously adding masses of fibrous material to the apparatus and continuously withdrawing oversized and non-fibrous waste material from the bottom thereof and separated fibers from the top thereof.

What we claim as new and desire to secure by Letters Patent of the United States is:

1. A method for separating individual fibers from a fibrous mass of α-alumina whiskers, said method comprising passing a pulsating stream of gas upwardly through said fibrous mass and through a separatory chamber containing said fibrous mass and collecting the fibers at the top of said separatory chamber, said pulsating stream having a volumetric flow rate and pressure only slightly greater than that necessary to carry individual fibers from said mass to the top of said chamber, said pulsating stream having a frequency in the range 1–18 per three second interval and a pressure, upstream of a 0.05 inch orifice inlet nozzle, of 2–100 pounds per square inch.

2. A method for separating individual fibers from a fibrous mass, as recited in claim 1, wherein said pulsating stream inlet nozzle is disposed below the base of said separatory chamber and is directed at different points at the base of the separatory chamber while the pulsating stream of gas is passed upwardly through said separatory chamber.

3. A method for separating individual fibers from a fibrous mass, as recited in claim 1, wherein extraneous material is injected into said separatory chamber just below the top of said chamber whereby the individual fibers, as collected, are intimately mixed with said extraneous material.

4. A method for separating individual fibers from a fibrous mass, as recited in claim 1, wherein the separating action of said upwardly flowing gas stream is enhanced by the injection, into said separatory chamber near the top thereof of a non-pulsating stream of compressed gas.

5. A method for separating individual fibers from a fibrous mass, as recited in claim 1, wherein said separatory chamber is generally cylindrical with a radius of about 2½ inches and a height of about 2 feet.

6. A method for separating individual fibers from a fibrous mass, as recited in claim 1, wherein a mass of α-alumina whiskers having individual whiskers varying from 1 to 1000 square microns in cross-sectional area and from ⅛ to ½ inch in length, is disposed at the bottom of a separatory chamber and is subjected to a compressed air jet pulsed at a frequency of 2.5 pulses per second first at a pressure of from 20 to 40 pounds per square inch, second, at a pressure of from 40 to 80 pounds per square inch; and third, at a pressure of 80 to 100 pounds per square inch, each of said pressures being maintained long enough to harvest separated $\alpha$-alumina whiskers of a specific size range.

7. Apparatus, for separating individual fibers from a fibrous mass, comprising a vertically disposed generally cylindrical separatory chamber, means at the bottom thereof for supporting a fibrous mass and at the top thereof for collecting individual fibers, and means disposed below said bottom supporting means for producing a pulsating, upwardly flowing entraining gas stream and a pulsed gas jet impinging upon the bottom of said mass and flowing upwardly through said mass, said jet producing means having a movable mounting adapted to allow said jet to be directed at any preselected point in the base of said separatory chamber.

8. Apparatus for separating individual fibers from a fibrous mass, as recited in claim 7, wherein said separatory chamber includes an enlarged generally spherical segment.

9. Apparatus for separating individual fibers from a fibrous mass, as recited in claim 7, wherein said separatory chamber includes projections from the interior walls of said chamber into the space within said chamber.

10. Apparatus for separating individual fibers from a fibrous mass, as recited in claim 7, wherein the apparatus also includes means for injecting an extraneous material into said separatory chamber for mixing and collection along with the fibers.

11. Apparatus for separating individual fibers from a fibrous mass, as recited in claim 7, wherein the apparatus also includes means for introducing directable non-pulsating gas jets into the separatory chamber.

References Cited

UNITED STATES PATENTS

| | | | |
|---|---|---|---|
| 287,496 | 10/1883 | Baur | 209—138 |
| 790,605 | 5/1905 | Waterhouse | 209—141 X |
| 1,197,622 | 9/1916 | Hallowell | 209—139 |
| 1,758,422 | 5/1930 | Anderson | 209—475 |
| 2,014,291 | 9/1935 | Reed | 209—475 |
| 2,389,701 | 11/1945 | Truesdale | 209—154 X |
| 2,579,228 | 12/1951 | Erickson | 209—154 X |
| 2,915,790 | 12/1959 | Rice | 209—138 X |
| 3,142,869 | 8/1964 | Gould et al. | 209—141 X |
| 3,295,677 | 1/1967 | Condolios | 209—138 X |

HARRY B. THORNTON, *Primary Examiner.*

TIM R. MILES, *Assistant Examiner.*

U.S. Cl. X.R.

19—65; 209—154